United States Patent [19]  
Goodzeit et al.

[11] Patent Number: 5,799,904  
[45] Date of Patent: Sep. 1, 1998

[54] TEMPERATURE CONTROL FOR SPACECRAFT INERTIAL CONTROL UNIT

[75] Inventors: Neil Evan Goodzeit, Princeton, N.J.; Arthur Jon Throckmorton, Newtown, Pa.

[73] Assignee: Lockheed Martin Corp., East Windsor, N.J.

[21] Appl. No.: 641,020

[22] Filed: Apr. 25, 1996

[51] Int. Cl.⁶ .................................................. B64G 1/66
[52] U.S. Cl. ..................... 244/163; 244/164; 244/158 R; 73/178 R
[58] Field of Search ................ 244/163, 164, 244/158 R; 73/178 R; 331/176, 158; 342/357

[56] References Cited

U.S. PATENT DOCUMENTS

| 5,473,289 | 12/1995 | Ishizaki et al. | 331/176 |
| 5,550,871 | 8/1996 | Lee | 375/344 |
| 5,654,718 | 8/1997 | Beason et al. | 342/357 |

*Primary Examiner*—Galen L. Barefoot  
*Attorney, Agent, or Firm*—W. H. Meise; C. A. Berard; S. A. Young

[57] ABSTRACT

A spacecraft (10) has an attitude sensor (20) mounted on its body (12). The sensor must be maintained near a temperature setpoint. Each sensor (20) produces its own temperature-indicative signal. Each attitude sensor is coupled to a thermally conductive instrument platform (18). A standoff (21) supports the platform (18) away from a baseplate (16) and the spacecraft body (12). The standoff (21) includes a thermally conductive portion (22) adjacent the platform (18), and a nonconductive portion (24) remote from the platform. An electric heater (26) is connected to the thermally conductive portion (22) of the standoff (21). A temperature sensor (28) thermally coupled to the platform (18) generates platform temperature signals. A filter (212) high-pass filters either the platform temperature signals or the attitude sensor temperature signals, to form filtered signals. A combining circuit (218) combines the filtered signals with the other temperature signals, to make composite temperature signals. A difference arrangement (224) coupled to the setpoint source (226) and to the combining circuit (218) generates error signals by subtracting composite temperature signals from setpoint signals. A PI processor (232) generates heater drive signals by summing proportional and integral signals. A driver (232) drives the heater (26) in response to the heater drive signals. When plural attitude sensors are mounted on the platform, the attitude sensor temperatures are averaged before further processing. The filter (212) may have a cutoff frequency which is the reciprocal of the thermal delay between the heater (26) and the attitude sensors (20), and may have a low-pass noise characteristic.

14 Claims, 5 Drawing Sheets

TEMPERATURE CONTROL FOR SPACECRAFT INERTIAL CONTROL UNIT

FIELD OF THE INVENTION

This invention relates to spacecraft attitude control systems, and more particularly to temperature control of components of such an attitude control system.

BACKGROUND OF THE INVENTION

The manufacturer of a spacecraft does not necessarily fabricate every portion of the spacecraft. It is very common for independent vendors to provide various portions of a spacecraft, which are then integrated by the spacecraft manufacturer. One such portion of a spacecraft is the attitude sensor unit or module, which is used in the spacecraft guidance, navigation and control (GN&C) system. A particularly advantageous attitude sensor module is the A2100 inertial measurement unit (IMU), supplied by Litton Guidance and Control, whose address is 679 Hollister Avenue, Goleta, Calif. 93117, and which is illustrated in FIGS. 1a and 1b. This IMU uses hemispherical resonator gyros (HRG) for high accuracy inertial rate sensing. In FIG. 1, a panel portion of a spacecraft 10 is designated as 12. The attitude sensor module or box is represented as 14, and includes a mounting wall or baseplate 16, and other walls 15. As illustrated in FIGS. 1a and 1b, this particular module 14 includes a plurality of attitude sensor elements, illustrated together as 20. Since the attitude sensor elements 20a, 20b, 20c, and 20d themselves are temperature sensitive, the vendor mounts all of the attitude sensors 20 on a thermally conductive instrument platform 18 within the box 14. The instrument platform 18 on which the attitude sensors 20 are mounted is an aluminum block which is spaced away from mounting wall or baseplate 16 of the box 14 by a plurality of standoffs designated generally as 21, some of which are designated as 21a, 21b, and 21c in FIG. 1a. Each of the standoffs 21 includes a thermally conductive portion adjacent to the instrument platform 18, and a thermally nonconductive portion adjacent to the baseplate 16. For example, standoff 21a includes a thermally conductive portion 22a adjacent to, and in thermal contact with, the instrument platform 18, and also includes a thermally insulating foot 24a lying between the thermally conductive portion 22a of the standoff 21a and the mounting wall or baseplate 16 of the module 14. Similarly, standoff 21b includes a thermally conductive portion 22b adjacent to, and in thermal contact with, the instrument platform 18, and also includes a thermally insulating foot 24b lying between the thermally conductive portion 22b of the standoff 21b and the mounting wall or baseplate 16 of the module 14, and standoff 21c includes a thermally conductive portion 22c adjacent to, and in thermal contact with, the instrument platform 18, and also includes a thermally insulating foot 24c lying between the thermally conductive portion 22c of the standoff 21c and the mounting wall or baseplate 16 of the module 14. The thermally insulating feet 24a, 24b, and 24c reduce thermal conduction between the remainder of the thermally conductive standoff and the wall of the box, so as to tend to thermally isolate the instrument platform 18 from exterior mounting wall or baseplate 16 of the box 14. The insulating feet in one embodiment of the invention are made from a ceramic material, such as MACOR.

Electrically controlled heaters are affixed to the thermally conductive portions of the standoffs for heating the standoffs, and, when energized, provide heat, which is preferentially conducted to the instrument platform rather than to the baseplate. For example, in FIGS. 1a and 1b, electrical strip heater 26a is mounted on the thermally conductive portion 22a of standoff 21a, electrical strip heater 26b is mounted on the thermally conductive portion 22b of standoff 21b, and electrical strip heater 26c is mounted on the thermally conductive portion 22c of standoff 21c. To aid the user in temperature control of the instrument platform 18 on which the attitude sensors 20 are mounted, the vendor provides a thermistor temperature sensor, illustrated as 28, mounted on the instrument platform 18, and thermally coupled thereto. However, the vendor provides no temperature controller, nor does the vendor suggest an appropriate controller.

FIG. 1c illustrates a conventional prior-art set-point temperature controller which was tried for control of the instrument platform temperature in a simulated spacecraft environment. In the arrangement of FIG. 1c, the thermistor signal (or an amplified or linearized version thereof) is applied to the inverting input port of a subtracting circuit 98, and subtracted from a signal representing the temperature setpoint, to produce an error signal representing the difference between the setpoint temperature and the temperature of the thermistor 28. The error signal is applied to a driver circuit 96, in which a pulse-width modulated signal responsive to the error signal is generated, and the resulting electrical pulses are applied to the heaters 26.

FIG. 5a illustrates a plot of baseplate temperature versus time in hours under simulated spacecraft operating conditions for the system of FIG. 1c. As illustrated, a temperature variation of about ±10° C. of the baseplate occurs over a 24-hour period, with a maximum rate of change of temperature of about 100 per hour. While the instrument platform has its temperature stabilized by the control loop of FIG. 1c, the temperature of the gyros changes about ±2° C., as illustrated in FIG. 5b. The temperature error occurs despite the platform temperature control as a result of temperature gradients across the platform, which are attributable to heat loss from the platform to the surroundings by paths other than the standoffs. This amount of temperature change of the gyros may cause unacceptable attitude errors.

It is difficult to maintain the attitude sensor elements 20 of FIGS. 1a and 1b within a temperature range necessary for small attitude errors, because the effective thermal time constant between the heater elements and the attitude sensor elements is so long at about 3000 seconds, that a compensator (controller) lead time constant on the order of a half-hour is required.

Improved temperature control for a spacecraft attitude controller is desired.

SUMMARY OF THE INVENTION

A spacecraft according to the invention includes a body and a thermally conductive instrument mounting platform. The spacecraft also includes an attitude sensor element, mechanically mounted on, and thermally coupled to, the instrument platform. The attitude sensor element generates attitude sensor temperature signals which include information about the temperature of the attitude sensor element. The attitude sensor element is sensitive to its temperature, and is specified for operation near a temperature setpoint. A thermally conductive baseplate is mounted on, and thermally coupled to the spacecraft body. The baseplate is part of the attitude sensor module. A standoff mechanically mounts the instrument platform to the baseplate. The standoff includes a thermally conductive portion adjacent to, and in thermal contact with, the instrument platform, and also includes a thermally nonconductive portion mounted between the baseplate and the thermally conductive portion of the standoff, for reducing the flow of thermal energy between the instrument platform and the baseplate. Those skilled in the art know that thermal conduction and nonconduction are relative terms, with aluminum, copper, and silver, for example, being among the more conductive, and rigid foams being among the less conductive. The spacecraft further includes an electrically controllable heater thermally coupled to the thermally conductive portion of the standoff, for supplying thermal energy to the thermally conductive portion of the standoff, thereby preferentially coupling the thermal energy to the instrument platform rather than to the baseplate. As a result of the application of thermal energy to the instrument platform, a temperature difference may appear across the interface between the instrument platform and the attitude sensor elements, which in turn may result in generation of mechanical stresses at the interface between the attitude sensing element and the instrument platform, which tend to degrade the accuracy of the attitude sensing instrument. A temperature sensing element is thermally coupled to the instrument platform, for producing an instrument panel temperature signal. A filtering arrangement is coupled to at least one of (a) the attitude sensor element and (b) the temperature sensing element, for receiving therefrom at least one of (a) the attitude sensor temperature signals, and (b) the instrument platform temperature signals, respectively. The filtering arrangement relatively decreases the lower-frequency content of one of the attitude sensor temperature signals and the instrument platform temperature signals relative to its higher-frequency content, thereby producing high-pass temperature signals derived from one of (a) the attitude sensor temperature signals and (b) the instrument platform temperature signals. A summer is coupled at least to the filtering arrangement for receiving the high-pass temperature signals derived from one of (a) the attitude sensor temperature signals and (b) the instrument platform temperature signal therefrom, and is also coupled to receive the other one of (a) the attitude sensor temperature signals, and (b) the instrument platform temperature signals, for summing the high-pass temperature signals with the other one of (a) the attitude sensor temperature signals and (b) the instrument platform temperature signals, for thereby generating a processed temperature-representative signal. A source produces setpoint signals representing the temperature of the setpoint. A difference circuit is coupled to the source of setpoint signals and to the summer, for subtracting the processed temperature-representative signals from the setpoint signals, to thereby generate error signals. A proportional-integral processor is coupled to the difference circuit, for generating proportional signals which are proportional to the error signals and integral signals proportional to a time integral of the error signals, and for summing together the proportional and integral signals, for thereby producing heater drive signals. A driver is coupled to the processor and to the electrically controllable heater, for applying electrical energy to the heater in response to the heater drive signals, whereby a closed thermal control loop is defined which tends to maintain constant the long-term temperature of one of the attitude sensing element and the instrument platform, and to minimize the temperature difference between the instrument platform and the attitude sensor element, thereby reducing stresses at the interface and reducing attitude errors attributable thereto. In a particular embodiment of the invention, a plurality of the attitude sensor elements are mounted on the instrument platform, and the closed loop further includes an averaging arrangement coupled to each of the attitude sensors, for generating averaged attitude sensor temperature signals by averaging the temperatures represented by the individual attitude sensor temperature signals. In a preferred embodiment of the invention, the filtering arrangement attenuates the instrument platform temperature signal components lying below a predetermined frequency, which predetermined frequency is the reciprocal of the thermal time delay between the heater and the at least one attitude sensor. In another embodiment, the filtering arrangement includes a noise filtering arrangement, for attenuating frequencies above a second predetermined frequency, which second predetermined frequency is higher than the first predetermined frequency. The spacecraft may include an electrical power source, in which case the heater driver may include a pulse-width modulator, for coupling the electrical power source to the heater with a pulse width which is responsive to the heater drive representative signals. In a particular arrangement of the invention, the instrument panel temperature sensor is a thermistor.

DESCRIPTION OF THE DRAWING

FIG. 5b is a temperature versus time plot of the attitude sensors when the instrument block temperature is controlled by the prior-art controller of FIG. 1c and the baseplate temperature varies as in FIG. 5a;

DESCRIPTION OF THE INVENTION

Figure 1A:
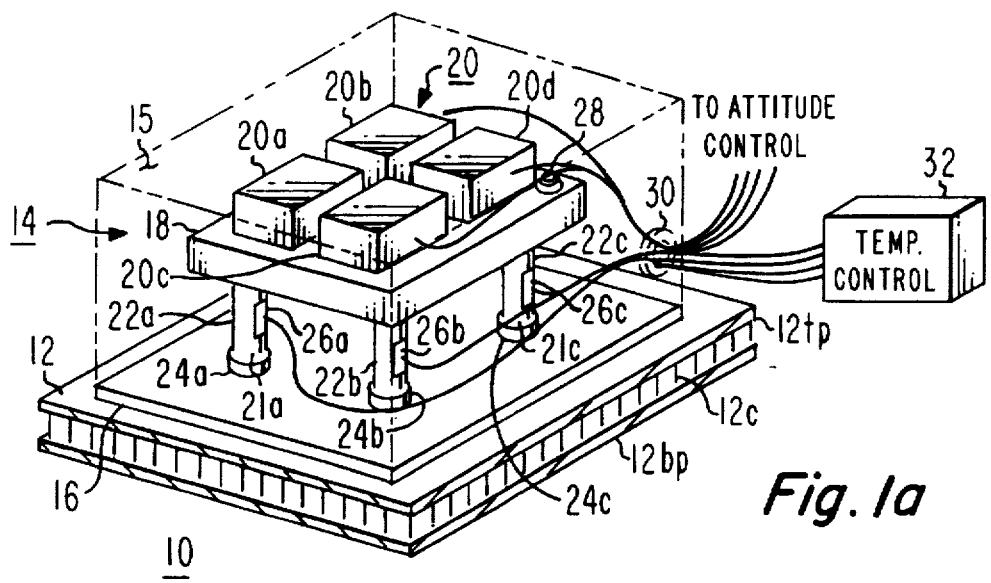
FIG. 1a is a perspective or isometric view of an attitude sensor module, with some portions in phantom or broken away for clarity.
Figure 1B:
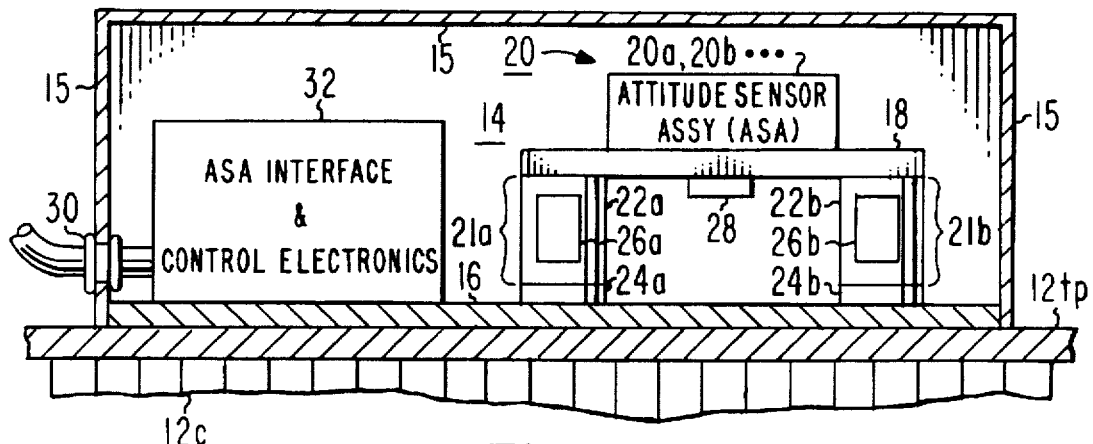
FIG. 1b is a side elevation view of the physical arrange of the module of FIG. 1a, and FIG. 1c is a representation of a prior-art temperature controller which might be used in conjunction with the thermistor of the attitude sensor module of FIGS. 1a and 1b.
Figure 1C:
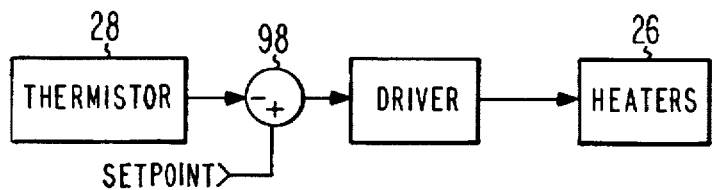

Module 14 of FIGS. 1a and 1b also includes an Attitude Sensor Array (ASA) interface and control electronic package, illustrated as 32. This ASA interface 32 is connected to, and interfaces between, the attitude sensor elements 20 and the outside world. Among the signals which appear at the outside-world output port 30 of the ASA 32 is a signal which represents the frequency of the resonator sphere of each of the attitude sensor units 20a, 20b, 20c, 20d, . . . to which ASA interface 32 is connected. The operating frequency of each spherical resonator is related to the frequency of the attitude sensor itself, so the ASA 32 produces a signal for each attitude sensor 20, which indicates its frequency, and which can therefore be used to indicate its temperature. The temperature relationship of this frequency is established within the attitude sensor element itself, so no additional processing is required in order to establish the indicated temperature. Direct control of the attitude sensor temperature itself can be attempted, instead of platform stabilization as described in conjunction with FIG. 1c, but, as mentioned, the control system will be difficult to stabilize, and may have degraded temperature control, because of the large thermal lag between the heaters and the attitude sensors.

Figure 2:
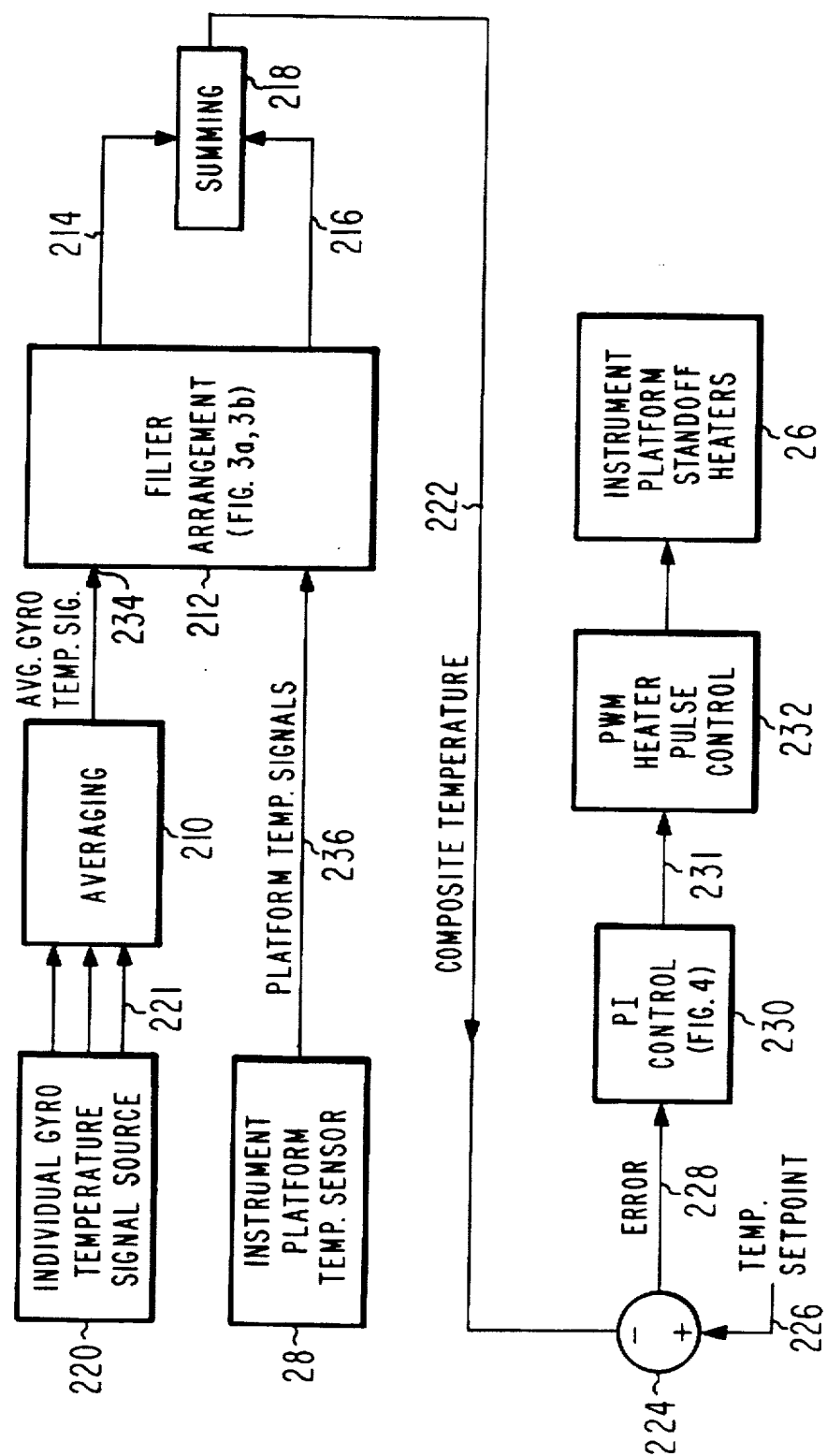
FIG. 2 is a simplified block diagram of a temperature control arrangement for spacecraft attitude sensors in accordance with an aspect of the invention.

FIG. 2 is a simplified block diagram of a temperature controller in accordance with an aspect of the invention. In FIG. 2, the individual resonator frequency signals originating from the attitude sensors are produced by a block 220, which represents the interface ASA 32 of FIGS. 1a and 1b, and the resonator frequency signals are applied over signal paths illustrated as 221 to a further block 210, which represents averaging of the signals, to produce a signal, on a signal path 234, which represents the average of the temperatures of the attitude sensors. The average-gyro-temperature signal is applied to a filter arrangement illustrated as 212. Filter arrangement 212 also receives the instrument platform temperature information over a signal path 236 from the instrument platform temperature sensor thermistor 28.

Filter arrangement 212 filters at least one of the two signals applied over signal paths 234 and 236, and the resulting "filtered" signals are applied over signal paths 214 and 216, respectively, to a difference circuit illustrated as a block 218. Difference circuit 218 produces a composite temperature signal, which is applied to the inverting input port of an error signal generator 224. In error signal generator 224, the composite temperature signal applied to the inverting input port is subtracted from the temperature setpoint signal applied to its noninverting input port over a path 226. The resulting error signal is applied over a path 228 to a proportional-integral (PI) controller 230, which is described in more detail below in conjunction with FIG. 4.

The output of PI controller 230 of FIG. 2 is applied over a signal path 231 to a pulse-width-modulated (PWM) heater pulse controller illustrated as a block 232. For the Litton attitude sensor module, the control cycle duration was selected to be sixteen seconds. The resulting pulses are applied to the heaters 26 on the standoffs 21 of FIGS. 1a and 1b.

Figure 3A:
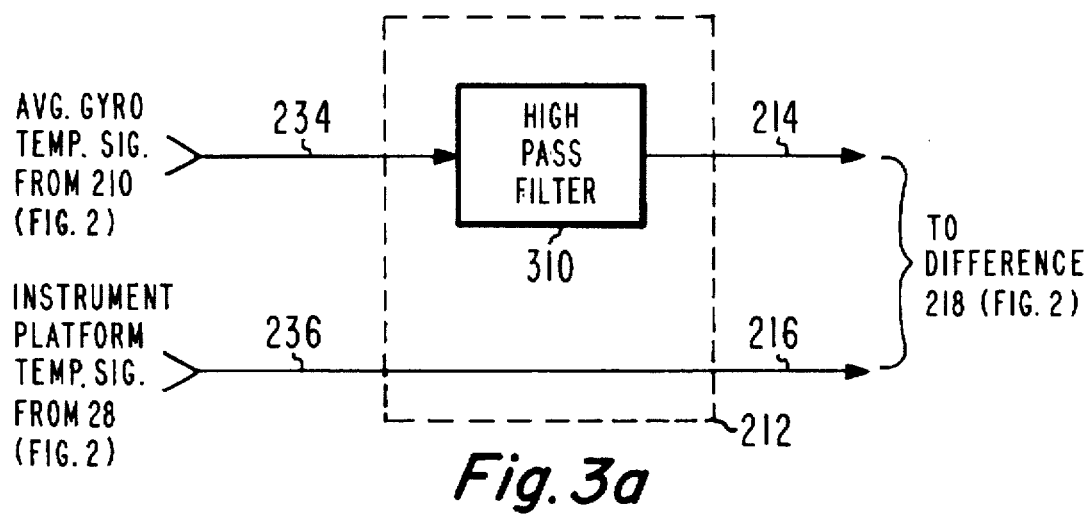
FIG. 3a is a simplified block diagram of a filter which may be used in the arrangement of FIG. 2 according to an embodiment of the invention.

FIG. 3a illustrates one embodiment of the filter arrangement 212 of FIG. 2. In FIG. 3a, the average gyro temperature signal from block 210 of FIG. 2 is applied over signal path 234 to a high-pass filter 310. As known to those skilled in the art, a high-pass filter includes the characteristics of a high-pass and a low-pass filter. The high-pass filter characteristic has a cutoff frequency below the cutoff frequency characteristic of the low-pass section. The high-pass characteristic attenuates the lower-frequency and direct components of the signal to be filtered, while the low-pass characteristic attenuates higher-frequency components which are likely to represent nothing more than noise.

In the arrangement of FIG. 3a, the instrument platform temperature signal applied over signal path 236 to filter arrangement 212 is passed unchanged to output signal path 216. This may be considered to be an all-pass filter characteristic. When the arrangement of FIG. 3a is used in conjunction with the arrangement of FIG. 2, difference circuit 218 receives only the high-frequency components of the attitude sensor temperatures. The composite signal produced at the output of difference circuit 218 of FIG. 3a includes only (or principally) the low-frequency characteristics of the instrument platform thermistor, because there is no low-frequency component in the average gyro temperature signal which can be subtracted from the thermistor signal. At the higher frequencies, the composite signal produced at the output of difference circuit 218 represents the difference between the attitude sensor temperature and the instrument platform signal, which are the temperature differences which cause the stresses which in turn contribute to the attitude sensor inaccuracies. The resulting temperature control loop urges the instrument platform temperature toward the setpoint temperature, and tends to minimize short-term differences between the temperatures of the instrument platform and the attitude sensors taken as a unit. This, in turn, tends to hold the temperatures of the attitude sensors closer to the setpoint, and thereby improves accuracy.

Figure 3B:
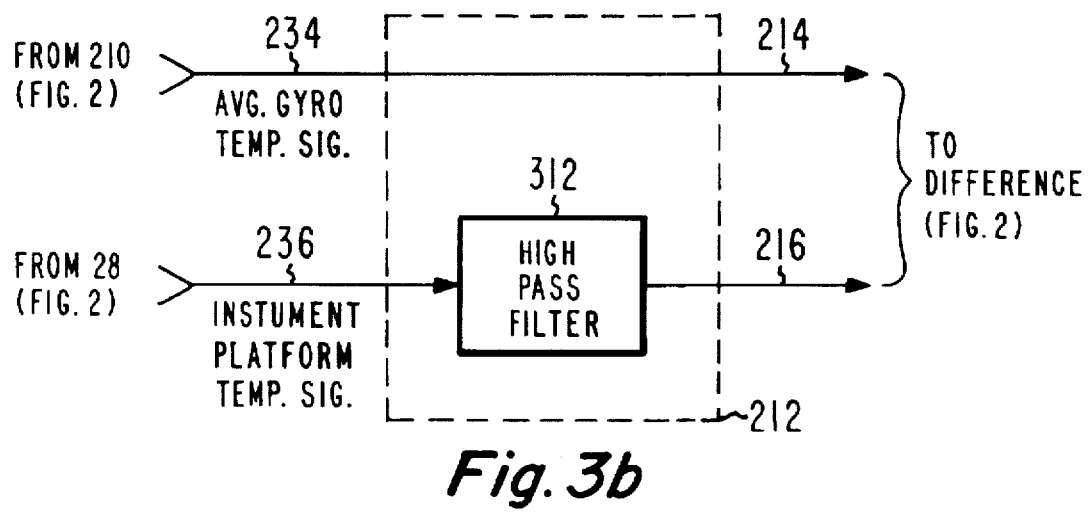
FIG. 3b is a similar diagram of another embodiment of the invention.

FIG. 3b illustrates an alternative embodiment of filter 212 of FIG. 2. In FIG. 3b, the high-pass filtering is applied to the instrument platform temperature signal, rather than to the attitude sensor temperature signal. By analogy with the above description, the resulting temperature control urges the temperature of the attitude sensors, on average, toward the setpoint, and minimizes short-term temperature variations of the platform, thereby more accurately controlling the attitude sensor temperature.

Figure 4:
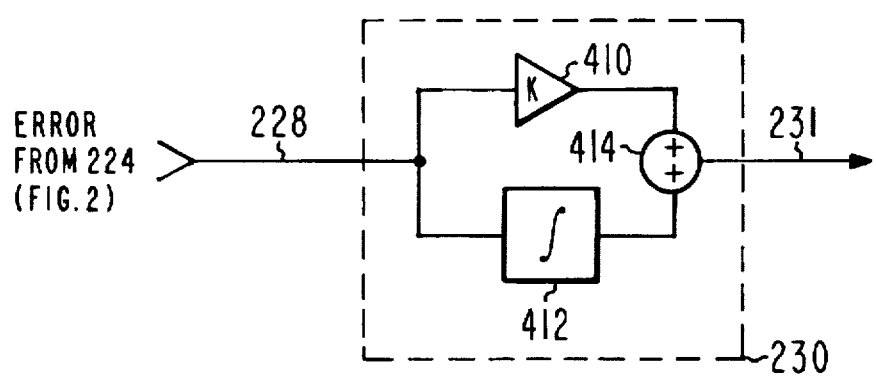
FIG. 4 is a simplified block diagram of a controller which may be used in the arrangement of FIG. 2 according to an aspect of the invention.

FIG. 4 is a simplified block diagram illustrating details of proportional-integral controller 230 of FIG. 2. In FIG. 4, the error signal from error signal generator 224 of FIG. 2 is applied by way of signal path 228 to a multiplier 410, for multiplying the signal by a constant K to produce a proportional signal proportional to the error signal. The proportional signal is applied from multiplier 410 to a first noninverting input port of a summing circuit 414. The error signal appearing on signal path 228 is also applied to an integrator or integrating circuit illustrated as a block 412, which produces a signal which represents a long-term summation of the error signal. The resulting integral signal is applied to a second noninverting input port of summing circuit 414. The resulting PI signal is produced on signal path 231. A PI controller tends to stabilize a feedback loop, as is well known to those skilled in the controller arts.

Figure 5A:
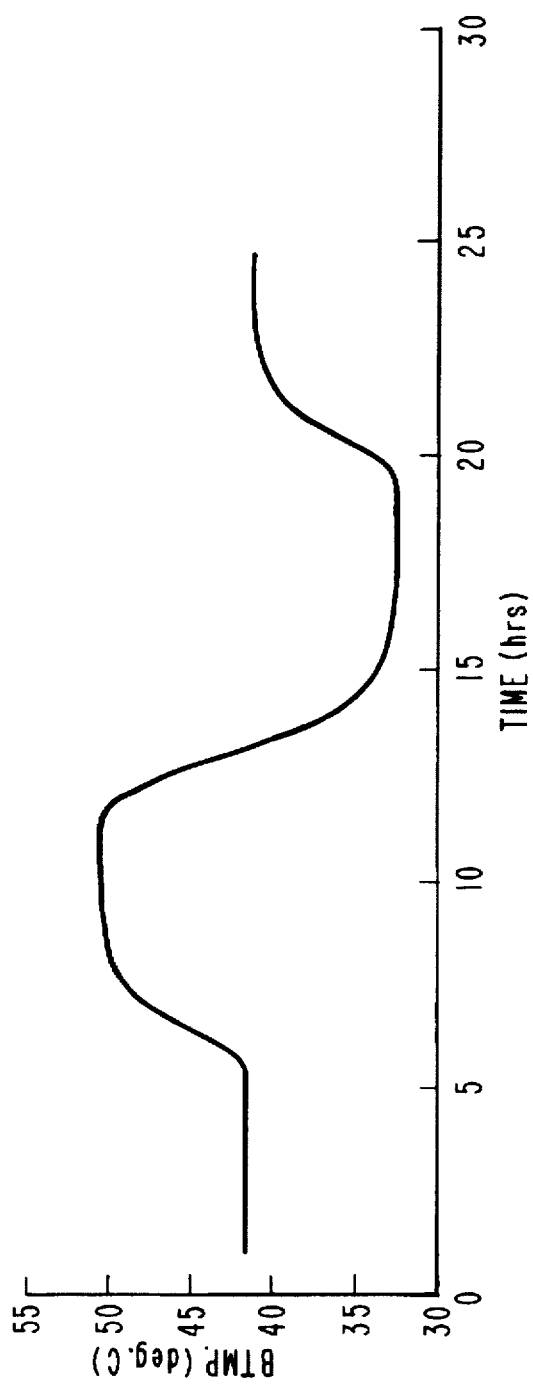
FIG. 5a is a plot of baseplate temperature versus time of an attitude sensing arrangement under conditions simulating spacecraft operation.
Figure 5B:
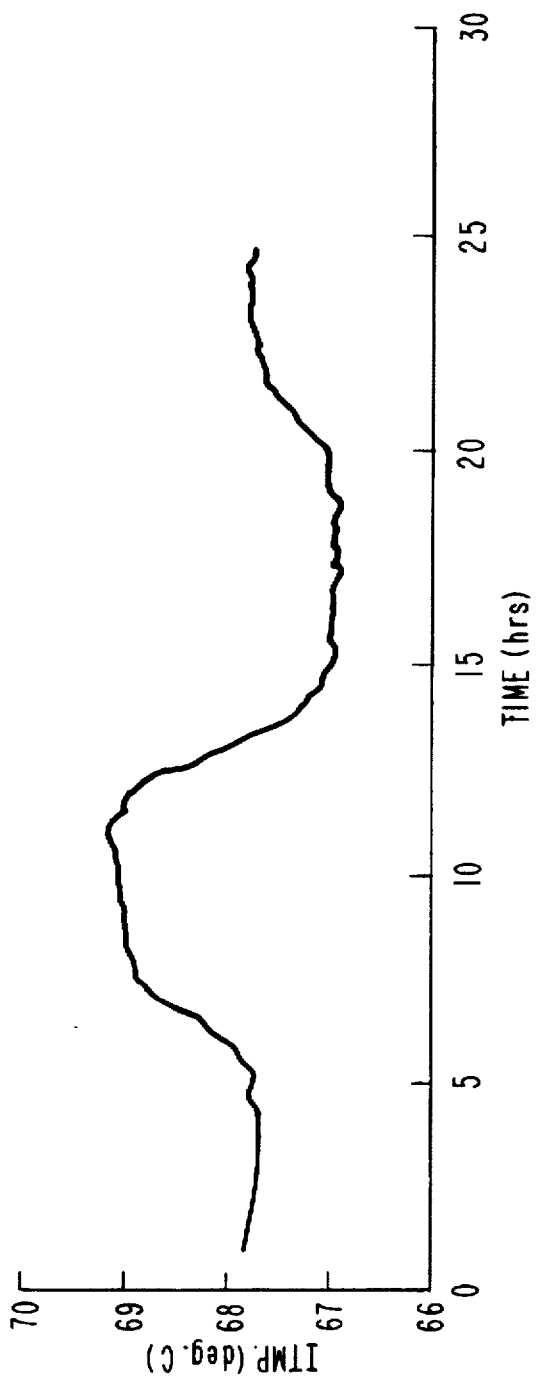
Figure 6:
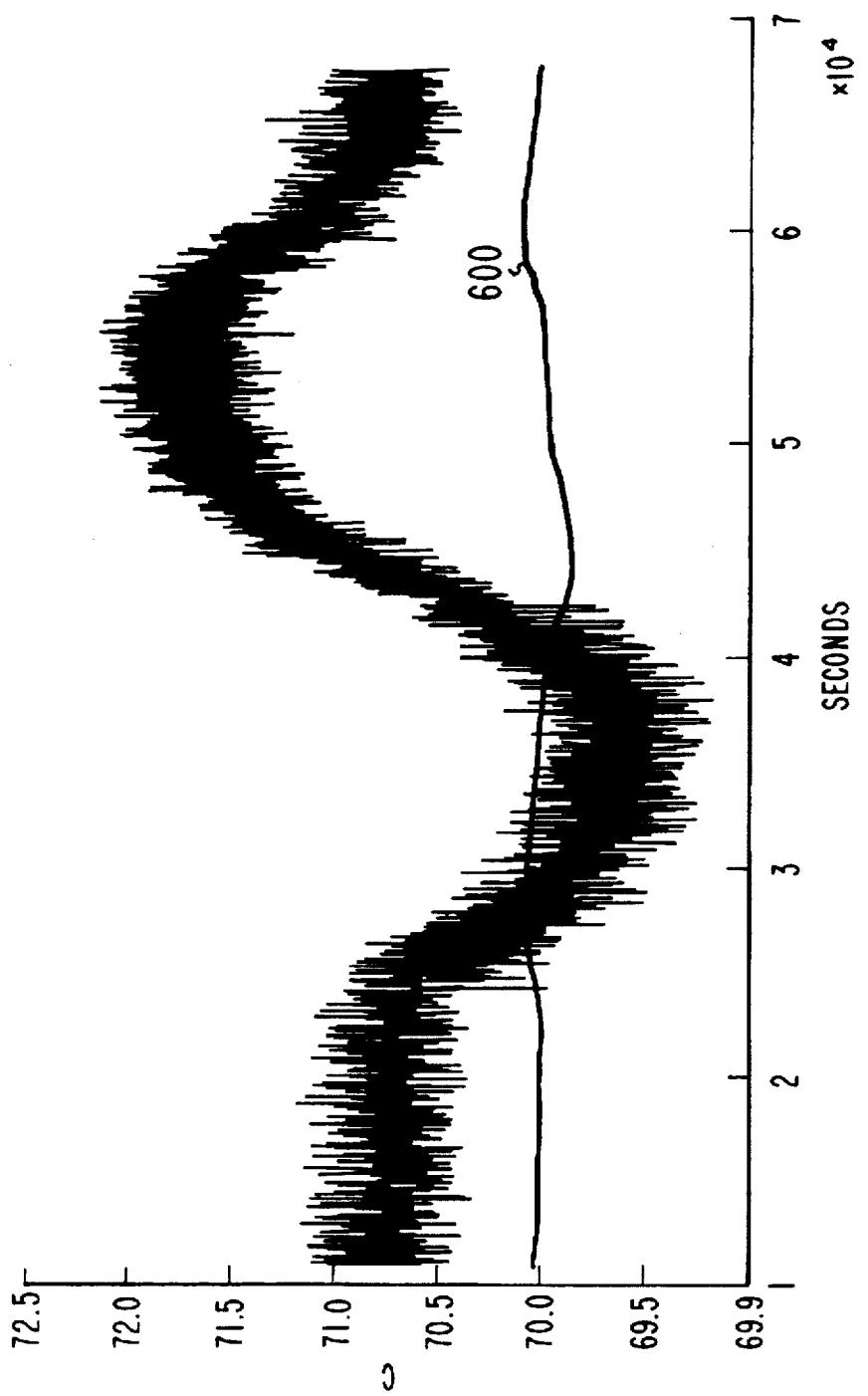
FIG. 6 is a plot of temperature versus time for attitude sensors controlled by a temperature controller according to the invention.

The controller according to the invention solves the control problem associated with the long thermal time constants in part by using the instrument block temperature signal to provide a lead compensation component of the composite control signal. The leading characteristic arises from the location of the instrument platform thermistor close to the attitude sensors which are to be controlled, because the thermal energy must be manifested at the instrument platform before it can reach the attitude sensors themselves. The arrangement of FIG. 2/ 3b appears to be more effective than the FIG. 2/ 3a embodiment. FIG. 6 illustrates as a plot 600 the result of temperature control of the arrangement of FIG. 2 with the filter of FIG. 3b. As can be seen by comparison with the plot of FIG. 5b, the temperature variations are reduced by a factor almost ten, to 0.25° C. peak-to-peak (P—P).

Somewhat improved performance can be achieved if the integrator in the PI controller is disabled during those times in which the heaters are full-ON or in which the heater power demand is negative. For reliability, it should be possible to switch to control exclusively from the instrument platform thermistor if the attitude sensor unit resonator frequency signals become unavailable.

Consequently, a spacecraft (10) according to the invention includes a body and a thermally conductive instrument mounting platform (18). The spacecraft also includes an attitude sensor element (20a, 20b, . . . ) , mechanically mounted on, and thermally coupled to, the instrument platform (18). The attitude sensor element generates attitude sensor temperature signals which include information about the temperature of the attitude sensor element. The attitude sensor element is sensitive to its temperature, and is specified for operation near a temperature setpoint. A thermally conductive baseplate (16) is mounted on, and thermally coupled to the spacecraft body (10). The baseplate is part of the attitude sensor module. A standoff (20) mechanically mounts the instrument platform (18) to the baseplate (16). The standoff includes a thermally conductive portion (22a, 22b, 22c, . . . ) adjacent to, and in thermal contact with, the instrument platform (18), and also includes a thermally nonconductive portion (24a, 24b, 24c, . . . ) mounted between the baseplate (16) and the thermally conductive portion (22a, 22b, 22c, . . . ) of the standoff, for reducing the flow of thermal energy between the instrument platform (18) and the baseplate (16). The spacecraft further includes electrically controllable heater (26a, 26b, 26c, . . . ) thermally coupled to the thermally conductive portion (22a, 22b, 22c, . . . ) of the standoff (21), for supplying thermal energy to the thermally conductive portion (22a, 22b, 22c, . . . ) of the standoff (21), for preferentially coupling the thermal energy to the instrument platform (18) rather than to the baseplate (16). As a result of the application of thermal energy to the instrument platform, stresses are generated at the interface between the temperature sensing element and the instrument platform, which tend to degrade the accuracy of the attitude sensing instrument. A temperature sensing element (28) is thermally coupled to the instrument platform (18), for producing an instrument platform temperature signal. A filtering arrangement (212) is coupled to at least one of (a) the attitude sensor element and (b) the temperature sensing element, for receiving therefrom at least one of (a) the attitude sensor temperature signals, and (b) the instrument platform temperature signals. The filtering arrangement relatively decreases the lower-frequency content of one of the attitude sensor temperature signals and the instrument platform temperature signals relative to its higher-frequency content, thereby producing high-pass temperature signals derived from one of (a) the attitude sensor temperature signals and (b) the instrument platform temperature signals. A summer (218) is coupled at least to the filtering arrangement (212) for receiving the high-pass temperature signals derived from one of (a) the attitude sensor temperature signals and (b) the instrument platform temperature signal therefrom, and is also coupled to receive the other one of (a) the attitude sensor temperature signals, and (b) the instrument platform temperature signals, for combining the high-pass temperature signals with the other one of (a) the attitude sensor temperature signals and (b) the instrument platform temperature signals, for thereby generating a processed temperature-representative signal. A source (226) produces setpoint signals representing the temperature of the setpoint. A difference circuit (224) is coupled to the source of setpoint signals (226) and to the summer (218), for subtracting the processed temperature-representative signals from the setpoint signals, to thereby generate error signals. A proportional-integral processor (230) is coupled to the difference circuit (224), for generating proportional signals which are proportional to the error signals and integral signals proportional to a time integral of the error signals, and for summing together the proportional and integral signals, for thereby producing heater drive signals. A driver (232) is coupled to the processor and to the electrically controllable heater, for applying electrical energy to the heater in response to the heater drive signals, whereby a closed thermal control loop is defined which tends to maintain the long-term temperature of one of the attitude sensing element and the instrument platform constant, and to minimize the temperature difference between the instrument platform and the attitude sensor element, thereby reducing stresses at the interface and reducing attitude errors attributable thereto. In a particular embodiment of the invention, a plurality of the attitude sensor elements are mounted on the instrument platform, and the closed loop further includes an averaging arrangement coupled to each of the attitude sensors, for generating attitude sensor temperature signals by averaging the temperatures represented by the attitude sensor temperature signals. In a preferred embodiment of the invention, the filtering arrangement attenuates the instrument platform temperature signals lying below a predetermined frequency, which predetermined frequency is the reciprocal of the thermal time delay between the heater and the at least one attitude sensor. In another embodiment, the filtering arrangement includes a noise filtering arrangement, for attenuating frequencies above a second predetermined frequency, which second predetermined frequency is higher than the first predetermined frequency. The spacecraft should include an electrical power source, in which case the heater driver may include a pulse-width modulator, for coupling the electrical power source to the heater with a pulse width which is responsive to the heater drive representative signals. In a particular arrangement of the invention, the instrument panel temperature sensor is a thermistor.

Other embodiments of the invention will be apparent to those skilled in the art. For example, the invention is preferably embodied in a manner which uses digital control wherever possible, but analog processing may be used if appropriate. While temperature sensing of the baseplate has been described as being performed by a thermistor sensor, other types of temperature sensors can be used, as for example an infrared temperature sensor. While the heater drive is described as a pulse-width modulation system, a linear modulator could be used, although it is less efficient. While the attitude sensor array is illustrated as including a plurality of attitude sensors, there may be only one attitude sensor in each module. Those skilled in the art know that thermal conduction and nonconduction are relative terms, with aluminum, copper, and silver, for example, being among the more conductive, and rigid foams being among the less conductive. Controllers other than PI, such as PID, may be usable, even though they may not provide as close a temperature control. As a further possibility, the heaters on each standoff may be controlled by a separate controller, which receives the attitude sensor temperature signal from that one of the attitude sensors which is closest to that particular standoff, and which sums its own attitude sensor temperature signal with the instrument platform temperature, whereby the instrument platform temperature is used in common for all of the standoff heaters.

What is claimed is:

1. A spacecraft including a body, said spacecraft comprising:

a thermally conductive instrument platform;

an attitude sensor element, mechanically mounted on, and thermally coupled to, said instrument platform, said attitude sensor element generating attitude sensor temperature signals which include information about the temperature of said attitude sensor element, said attitude sensor element being sensitive to its temperature, and being specified for operation near a temperature setpoint;

a thermally conductive baseplate mounted on and thermally coupled to said spacecraft body;

a standoff for mechanically mounting said instrument platform to said baseplate, said standoff including a thermally conductive portion adjacent to and in thermal contact with said instrument platform, and a thermally nonconductive portion mounted between said thermally conductive portion of said standoff and said baseplate, for reducing the flow of thermal energy between said instrument platform and said baseplate;

electrically controllable heating means thermally coupled to said thermally conductive portion of said standoff, for supplying thermal energy to said thermally conductive portion of said standoff, for preferentially coupling said thermal energy to said instrument platform rather than to said baseplate, whereby application of thermal energy to said instrument platform generates stresses in the interface between said temperature sensing element and said instrument platform which tends to degrade the accuracy of said attitude sensing instrument;

a temperature sensing element thermally coupled to said instrument platform, for producing an instrument panel temperature signal;

filtering means coupled to at least one of (a) said attitude sensor element and (b) said temperature sensing element, for receiving therefrom at least one of (a) said attitude sensor temperature signals, and (b) said instrument platform temperature signals, for relatively decreasing the lower-frequency content of one of said attitude sensor temperature signals and said instrument platform temperature signals relative to the higher-frequency content of said one of said attitude sensor temperature signals and said instrument platform temperature signals, to thereby produce high-pass temperature signals derived from one of (a) said attitude sensor temperature signals and (b) said instrument platform temperature signals;

summing means coupled at least to said filtering means for receiving said high-pass temperature signals derived from one of (a) said attitude sensor temperature signals and (b) said instrument platform temperature signal therefrom, and also coupled to receive said other one of (a) said attitude sensor temperature signals, and (b) said instrument platform temperature signals, for combining said high-pass temperature signals with said other one of (a) said attitude sensor temperature signals, and (b) said instrument platform temperature signals, for thereby generating a processed temperature-representative signal;

a source of setpoint signals representing the temperature of said setpoint;

difference means coupled to said source of setpoint signals and to said summing means, for subtracting said processed temperature-representative signals from said setpoint signals, for thereby generating error signals;

proportional-integral processing means coupled to said difference means, for generating proportional signals which are proportional to said error signals, for generating integral signals proportional to a time integral of said error signals, and for summing together said proportional and integral signals, for thereby producing heater drive representative signals; and drive means coupled to said processing means and to said electrically controllable heating means, for applying electrical energy to said heating means in response to said heater drive representative signals, whereby a closed thermal control loop is defined which tends to maintain the long-term temperature of one of said attitude sensing element and said instrument platform constant, and to minimize the temperature difference between said instrument platform and said attitude sensor element, thereby reducing stresses at said interface and reducing attitude errors attributable thereto.

2. A spacecraft according to claim 1, wherein a plurality of said attitude sensor elements are mounted on said instrument platform, and wherein said summing means further includes average signals deriving means coupled to each of said attitude sensors, for generating said derived signals by averaging the temperatures represented by said attitude sensor temperature signals.

3. A spacecraft according to claim 1, wherein said filtering means attenuates said instrument platform signals below said predetermined frequency, which predetermined frequency is the reciprocal of the thermal delay between said heating means and said at least one attitude sensor.

4. A spacecraft according to claim 1, (wherein said filtering means includes noise filtering means, for attenuating frequencies above a second predetermined frequency, which second predetermined frequency is higher than said first predetermined frequency.

5. A spacecraft according to claim 1, further comprising an electrical power source, and wherein:

said drive means further comprises pulse-width modulation means for coupling said electrical power source to said heating means with a pulse width which is responsive to said heater drive representative signals.

6. A spacecraft according to claim 1, wherein said temperature sensing means comprises a thermistor.

7. A spacecraft according to claim 1, wherein said temperature sensing means is mechanically coupled to said instrument platform.

8. A spacecraft according to claim 1, wherein said filtering means comprises high-pass filtering means coupled to receive said one of said (a) said attitude sensor temperature signals, and (b) said instrument platform temperature signals, for relatively increasing the higher-frequency content of said one of said attitude sensor temperature signals and said instrument platform temperature signals relative to the lower-frequency content thereof, to thereby produce said relatively high-pass temperature signals and said relatively low-pass temperature signals.

9. A spacecraft according to claim 1, wherein said combining of said high-pass temperature signals with said other one of (a) said attitude sensor temperature signals, and (b) said instrument platform temperature signals, is a subtraction of said high-pass temperature signals from said other one of (a) said attitude sensor temperature signals, and (b) said instrument platform temperature signals.

10. A method for temperature-stabilizing an attitude sensor which includes its own attitude sensor temperature sensing means against temperature variations of a baseplate, where said attitude sensor temperature sensing means produces an attitude sensor temperature signal, said method comprising the steps of:

mounting said attitude sensor on a thermally conductive mounting platform;

mounting said mounting platform on said baseplate by means of a standoff including a thermally conductive portion adjacent to, and in thermal communication with said mounting platform, and also including a thermally nonconductive portion adjacent to said baseplate;

sensing the temperature of said mounting platform to thereby generate a mounting platform temperature signal;

high-pass filtering one of said mounting platform temperature signals and said attitude sensor temperature signals, to form high-pass filtered signals;

combining said high-pass filtered signals with the other one of said mounting platform temperature signals and said attitude sensor temperature signals to thereby generate combined temperature signals;

generating signals indicative of a desired temperature setpoint for said attitude sensor;

taking the difference between said temperature setpoint signals and said combined temperature signals, to thereby generate error signals;

processing said error signals with at least an integral characteristic, to thereby generate control signals; and heating said thermally conductive portion of said standoff in response to said control signals.

11. A method according to claim 10, wherein said step of high-pass filtering one of said mounting platform temperature signals and said attitude sensor temperature signals, includes the step of high-pass filtering said mounting platform signals to form high-pass filtered signals.

12. A method according to claim 10, wherein said step of combining said high-pass filtered signals with the other one of said mounting platform temperature signals and said attitude sensor temperature signals includes the step of taking the difference between said high-pass filtered signals and the other one of said mounting platform temperature signals and said attitude sensor temperature signals in order to generate said combined temperature signals.

13. A method according to claim 10, wherein said step of processing said error signals with at least an integral characteristic includes the step of processing said error signals with a proportional-integral control characteristic to thereby generate said control signals.

14. A method according to claim 10, wherein said step of heating said thermally conductive portion of said standoff in response to said control signals includes the step of generating pulses of electrical energy in response to said control signals, and applying said pulses of electrical energy to heating means associated with said thermally conductive portion of said standoff.

* * * * *